April 27, 1965 D. SHALER ETAL 3,180,933

COPY FEED FOR FACSIMILE TRANSMITTER

Filed Oct. 31, 1961 3 Sheets-Sheet 1

INVENTORS:
WILLIAM L. KACIN
DAVID SHALER

BY Edward F. Connors

ATTORNEY

COPY FEED FOR FACSIMILE TRANSMITTER

INVENTORS:
WILLIAM L. KACIN
DAVID SHALER
BY
Edward P. Connors
ATTORNEY

COPY FEED FOR FACSIMILE TRANSMITTER

Filed Oct. 31, 1961 3 Sheets-Sheet 3

INVENTOR.
WILLIAM L. KACIN
DAVID SHALER

BY Edward F. Connors

ATTORNEY

United States Patent Office 3,180,933 Patented Apr. 27, 1965

3,180,933
COPY FEED FOR FACSIMILE TRANSMITTER

David Shaler, Waldwick, N.J., and William L. Kacin, Bethpage, N.Y., assignors to Hogan Faximile Corporation, New York, N.Y.

Filed Oct. 31, 1961, Ser. No. 149,037
2 Claims. (Cl. 178—7.1)

The present invention relates to high speed facsimile transmitters, and particularly to a copy feed for a facsimile transmitter which permits efficient utilization of facsimile line and equipment time.

High speed facsimile equipment has been developed which will scan, transmit and record one eight and a half by eleven page per second with a resolution of one hundred lines per inch. Alternatively the graphic record may be eighteen inches wide in which event copy is made at the rate of four inches per second. Such equipment is thus able to record a million dots per second. Inasmuch as the equipment is quite expensive, of the order of one to two hundred thousand dollars per installation, and the transmission line costs are extremely high, it is important that the operation time of the facsimile equipment be efficiently used.

Among the copy transmitted is information stored on cards approximately three and one quarters inches in width by seven and three eighths inches in length and which include a microfilm window about one and one quarter inches in width by one and seven eighths inches in length. The microfilm contains the information to be transmitted while the remainder of the card may be printed or punched for identification or other purposes. In passing such cards through the facsimile transmitter only the microfilm information is scanned and transmitted, thus unless means are provided otherwise, the transmitter time would be seventy-five percent wasted as the microfilm length is only twenty-five percent of the length of the card.

In order to scan copy for facsimile transmission over wire lines or radio links, the signals representing the copy are usually generated by scanning the entire area of the copy as it is passed by a scanning window, the copy being scanned line-by-line, an elemental area at a time. A concentrated light beam is directed on or through the copy and the light transmitted through or from the elemental area is used to actuate a photoelectric cell, the output of which is amplified and passed through transmission equipment to the receiver where the electric signal is converted to graphic information as in a recorder using electrolytic paper.

In accordance with the present invention a copy feed is provided in which cards carrying a microfilm window are advanced through the scanner at a rapid rate until the microfilm reaches a scanning window at which time the advance mechanism is slowed down to the advance rate required by the scanning operation, and, at the conclusion of the scanning operation the card is again advanced at a rapid rate to clear the space for the next card.

The construction in accordance with the invention is advantageous in that it may be converted to the use of roll film whereupon there may be a fast advance between frames of the film, or if desired, a series of frames may be passed at high speed.

In accordance with the invention this is accomplished by the use of a copy feed adapted to receive a stack of cards carrying microfilm windows and which are rapidly moved into scanning position by a fast overriding mechanism which is automatically rendered inoperative when the scanning operation is to be started.

Another object of the invention is to provide a copy feed for facsimile transmitters which is simple and economical in manufacture, dependable in operation, and durable in use.

Other objects and advantages of the invention will be apparent from the following description and from the accompanying drawings which show, by way of example, embodiments of the invention.

Figure 1:
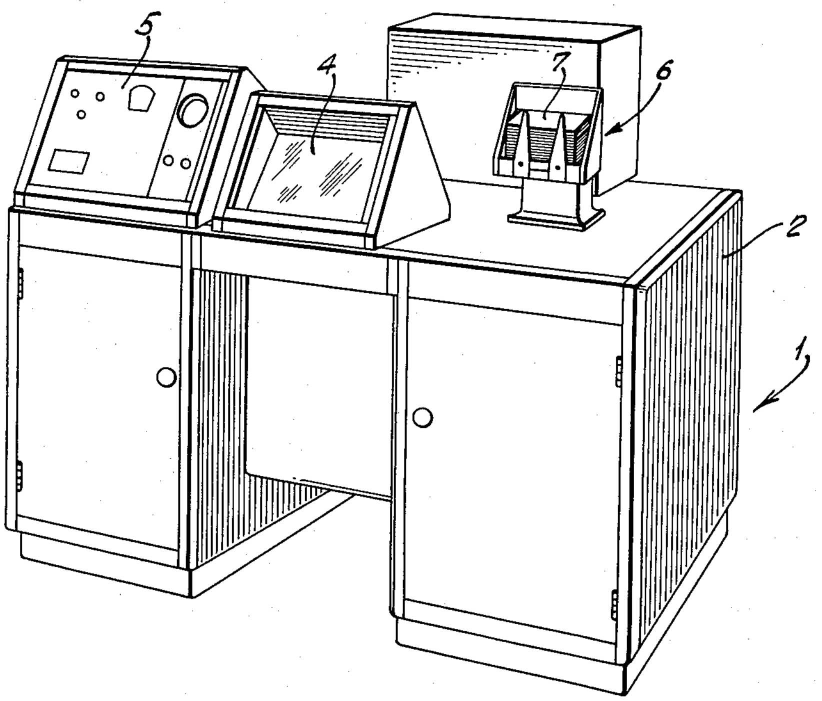
FIGURE 1 is a perspective view of a facsimile transmitter incorporating a copy feed in accordance with the invention.

Referring to the drawings there is shown in FIGURE 1 a high speed facsimile transmitter 1 incorporating a copy feed in accordance with the invention. The high speed transmitter 1 includes a cabinet 2, a visual observation window 4, a control panel 5, and a stack feed mechanism 6.

Figure 2:
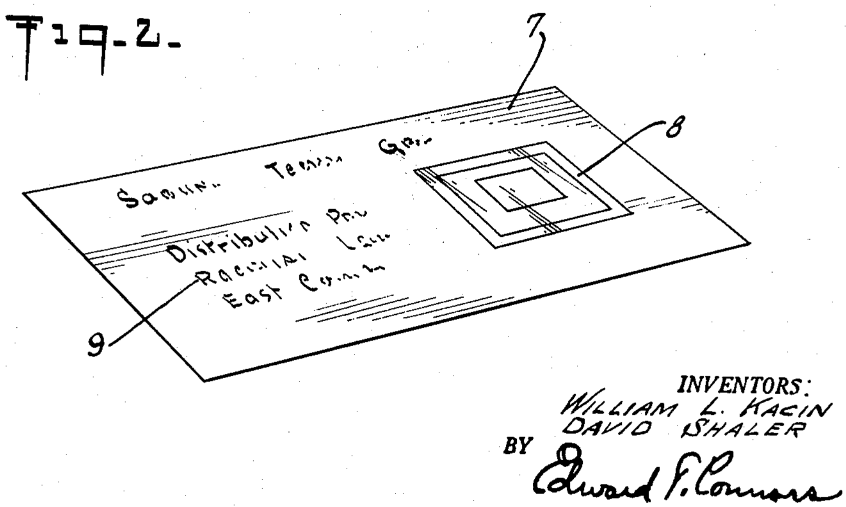
FIGURE 2 is a perspective view of a microfilm card illustrating the relative size of the microfilm window with respect to the size of the remainder of the card.

In FIGURE 2 there is shown a perspective view of an information card 7 having a microfilm window 8. Various indicia may be printed or punched on the card as indicated at 9.

Figure 3:
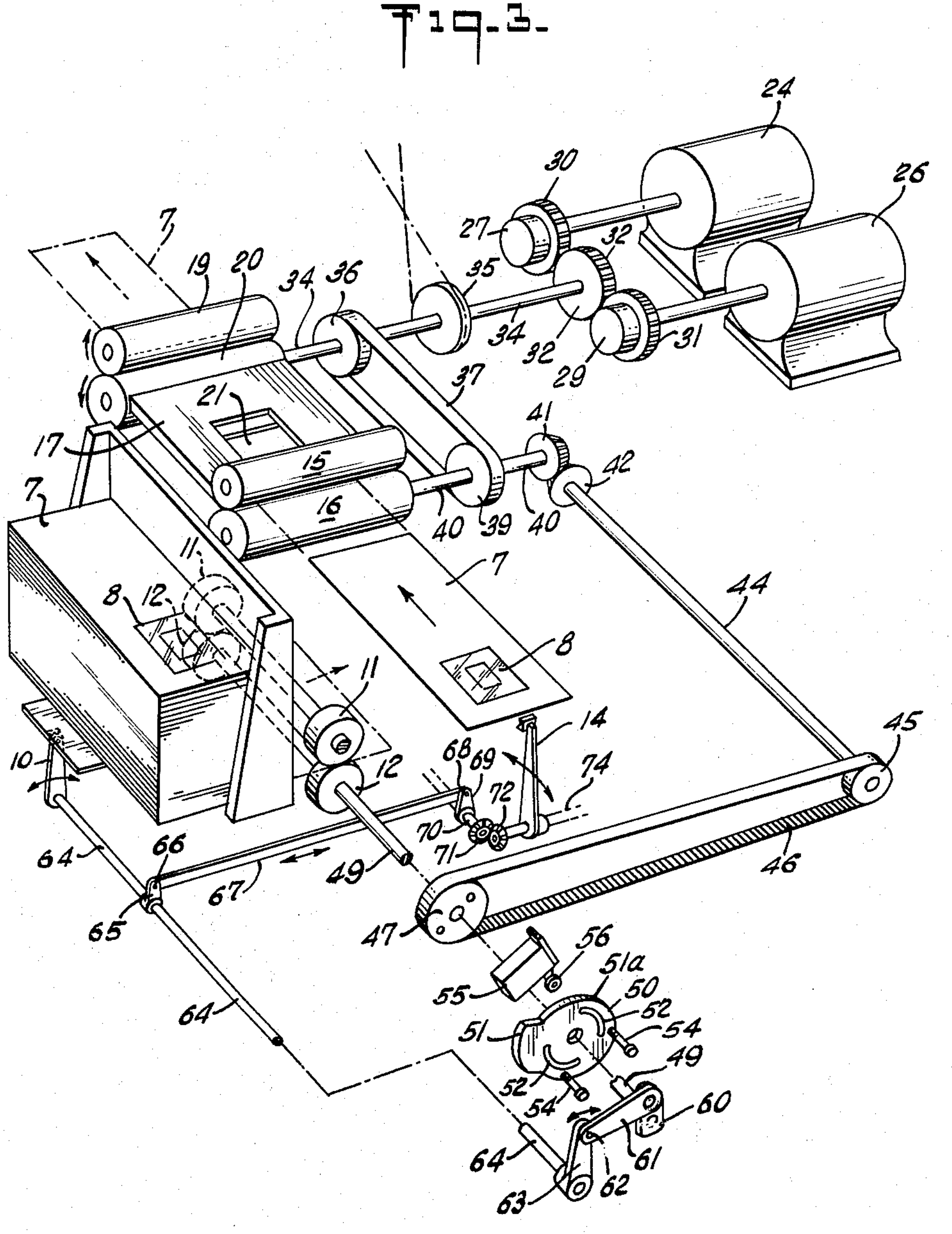
FIGURE 3 is an exploded schematic drawing of the copy feed mechanism.

In FIGURE 3 there is shown an exploded schematic view of the copy feed mechanism 6. The information cards 7 are placed in a vertically extending pile in the feeding mechanism 6. The bottom card is moved transversely by a first finger card advance member 10. The card is then moved into engagement with rubber-surfaced dual feed wheels 11 and 12 into a position in front of a second finger card advance member 14 which is adapted to move the card lengthwise into engagement between opposed rollers 15 and 16 which move the card 7 along a bed 17 until it is picked up between opposed rollers 19 and 20 and ejected from the machine. It is to be noted that the scanning operation takes place while the microfilm window 8 is being moved across a scanning window 21 positioned in the bed 17.

The mechanism for moving the cards past the scanning window 21 includes a fast motor 24 and a slow motor 26. Each of these motors have on their drive shafts overriding clutches 27 and 29 respectively positioned in the hubs of driving gears 30 and 31, the drive wheels 30 and 31 being in engagement with a driven wheel 32 positioned on a drive shaft 34 carrying a drive pulley 35 for a spring belt adapted to turn a film windup reel. Also on the drive shaft 34 is a pulley 36 carrying a belt 37 to drive a pulley 39 on a shaft 40. The shafts 34 and 40 are both extended to receive at their respective outer ends the rollers 20 and 16. The roller 20 is preferably somewhat larger in diameter than the roller 16 so that although both rollers are driven at the same rotational speed the surface speed of roller 20 is somewhat greater than the surface speed of roller 16 in order that when the cards 7 are engaged by both rollers there is a tendency for roller 20, in cooperation with its opposed roller 19, to tend to slightly tension the card 7 to insure against the buckling of the card as it passes the scanning window 21.

The drive for the finger advance members 10 and 14 may take any convenient form. A satisfactory driving means includes a bevel gear 41 on the end of the shaft 40 in engagement with another bevel gear 42 on one end of a shaft 44 which has at its other end a belt pulley 45 driving a belt 46. A pulley 47 is mounted on a shaft 49 to be driven by the belt 46 and turns the dual feed wheels 11 and 12. Also on pulley 47 is a rotatively adjustable cam wheel 50 having cam surfaces 51 and 51*a*. The cam wheel 50 has slots 52 through which extend bolts 54 to adjustably attach the cam wheel 50 to the pulley 47. A microswitch 55 carries a cam roller 56 to engage the cam surfaces 51 and 51*a* of the cam wheel 50. The microswitch is adapted to be connected in series with a supply circuit for the fast motor 24 and to interrupt the motor circuit while riding on the cam surface 51.

At the end of the shaft 49, and outwardly of the pulley wheel 47 and the cam wheel 50, is a crank 60 having a crank linkage member 61 connected by pivot member 62 to another crank 63 on a shaft 64. The purpose of the crank 60 with the crank linkage members 61 and 63 is to impart an oscillatory movement to the shaft 64. Shaft 64 has a driving arm 65 secured thereto, pivot means 66 attaches the driving arm 65 to a drive rod 67. In turn, the drive rod 67 is attached by a pivot 68 to a driving arm 69 secured to a shaft 70, which carries at its outer end a bevel gear 71. The bevel gear 71 engages a bevel gear 72 on a shaft 74 positioned at right angles to the shaft 70. The shaft 74 carries the second finger card advance member 14. The first finger card advance member 10 is carried by the shaft 64.

In the operation of the copy feed as shown on the schematic drawing of FIGURE 3, the device is set into motion by applying a source of power to the circuit supplying the motors 24 and 26. The fast motor 24 is started and turns its driving gear 30 through its clutch 27. Gear 30 rotates gear 32 and shaft 34 thus driving shaft 40 through belt 37. Bevel gear 41 turns bevel gear 42 and drives shaft 44, pulley 45, belt 46 and shaft 49. The crank 60, through its linkage 61 and 63, oscillates shaft 64 which moves the first finger card advance member 10 so that one of the cards 7 is pushed into engagement between the dual feed wheels 11 and 12.

The card 7 is then moved into position in front of the second finger card advance member 14 which, at its next oscillation, moves the card 7 into engagement between the opposed rollers 15 and 16.

The rotation of the rollers 15 and 16 moves the leading end of the card 7 past the scanning window 21 and into engagement by the opposed rollers 19 and 20. As the microfilm window 8 of the card 7 arrives at the leading edge of the scanning window 21, the cam surface 51 engages the cam wheel 56 thereby disconnecting the power for the fast motor 24.

During the operation of the fast motor 24, the slow motor 26 has been rotating but not carrying load; inasmuch as its drive wheel gear 31 has been turned rapidly by the gear 30, the overriding clutch 29 permitting the faster movement of the gear 31 with respect to the movement of the drive shaft of the slow motor 26. Upon the opening of the microswitch 55, the fast motor 24 is deenergized and stops thereby allowing its gear 30 to slow down in speed. The overriding clutch of the slow motor 26 then picks up the load attached to its driving gear 31 and the card 7 is continued in movement past the scanning window 21 but at a reduced rate of speed.

After the microfilm window 8 has passed the scanning window 21, the cam surface 51*a* again is contacted by the cam wheel 56 causing the fast motor 24 to start and quickly move the card 7 away from the bed 17 and another card is brought into position for scanning.

Figure 4:
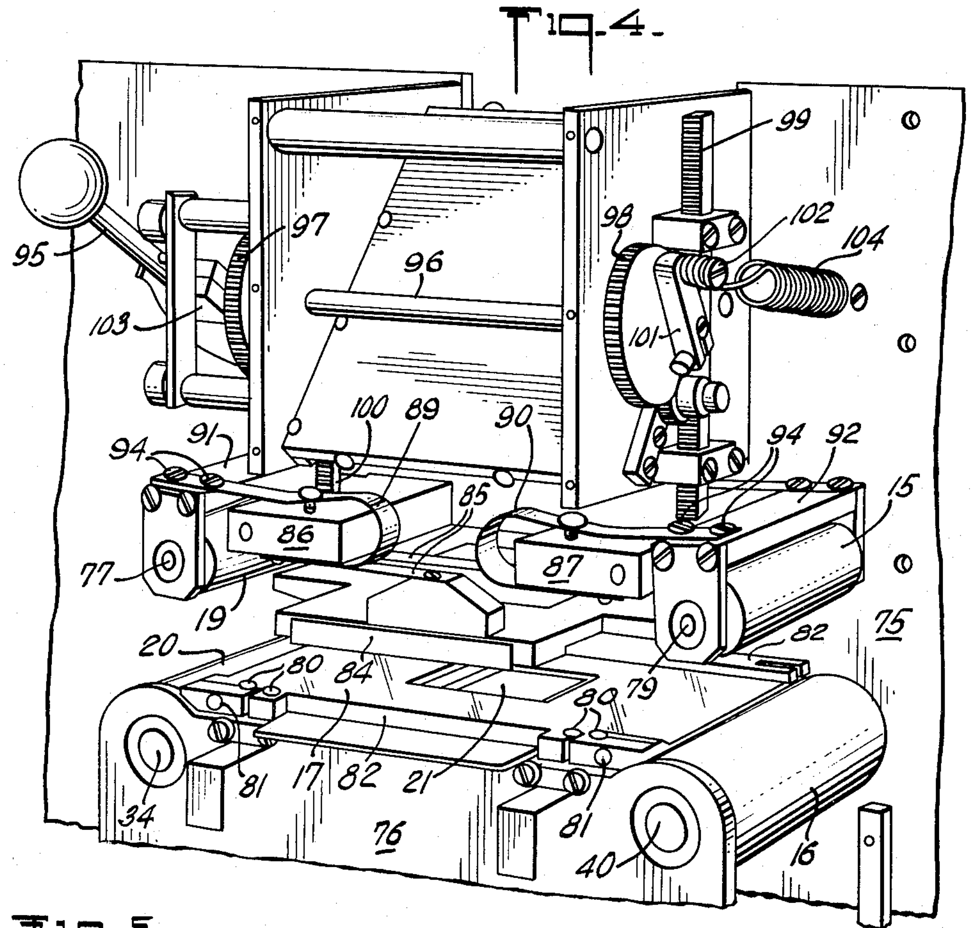
FIGURE 4 is a perspective view of a portion of the copy feed mechanism.

In FIGURE 4 there is shown a perspective view of a portion of the commercial embodiment of the copy feed in accordance with the invention. A back plate 75 together with a face place 76 provides means to support the shafts 34 and 40 carrying the rollers 20 and 16. Likewise shafts 77 and 79 are provided for the support of the rollers 19 and 15. The bed 17 is provided with leveling screws 80 and with locking screws 81 to secure the leveling screws 80 at their set position. Flanges 82 are provided so that the card 7 will be properly positioned as it passes the scanning window 21.

In order to hold the card 7 flat against the bed 17, a head 84 is provided and supported by light springs 85 carried by blocks 86 and 87 which are in turn supported by comparatively heavy springs 89 and 90 secured to supporting plates 91 and 92 by screws 94. The head 84 may be removed and replaced by a similar head having a groove therein of a size to pass a section of a strip film as will be hereinafter described.

In order to raise the head 84 as for adjustment of the parts or inspection thereof, or to remove a card, a control lever 95 is provided and secured to a shaft 96 carrying at its ends pinions 97 and 98 which engage with rack members 99 and 100 to carry the blocks 86 and 87. In order to maintain the head assembly in either raised or lowered position, a crank member 101 with a crank pin 102 is positioned at the end of the shaft 96 in a toggle-type arrangement, a spring 104 being provided to hold the crank pin 102 under tension so that the head is maintained in either its upper or in its lower position, or in an intermediate position by engagement of detent means 103.

In lowering the head 84 it should be noted that contact is first made between the head 84 and the bed 17 by the head 84 carried by the light springs 85. As the control lever 95 is moved to the bottom of its downward stroke the heavier springs 89 and 90 come into play providing heavier pressure in maintaining the head 84 in pressure contact with the bed 17.

In the commercial embodiment the rollers 16 and 20 are provided with a stainless steel surface and the rollers 15 and 19 are rubber covered. It should be noted that the drive for the card 7 is through the rollers 16 and 20 and their surface is made of stainless steel to ensure that their diameters will remain unchanged irrespective of the pressure applied thereto. This is very important inasmuch as the drive rate of the cards 7 past the scanning window 21 must be without appreciable variation and at a preset speed in order that the scanning operation may be properly accomplished. The rollers 15 and 19 are rubber covered to provide good contact with the cards 7 and to provide a certain amount of resiliency. The rollers 15 and 19 are somewhat greater in length than the width of the cards 7 so that direct contact is made between the rollers 16 and 15 with the rollers 19 and 20 outwardly of the edges of the card 7. It has been found that this construction provides an accurate feed for the cards 7 so that the scanning operation is accomplished in a proper manner. It should be noted that any deviation in the rate of the feed of the cards 7 produces an error in the recorded copy of the order of about fifteen times of the amount of variation in the drive.

Figure 5:
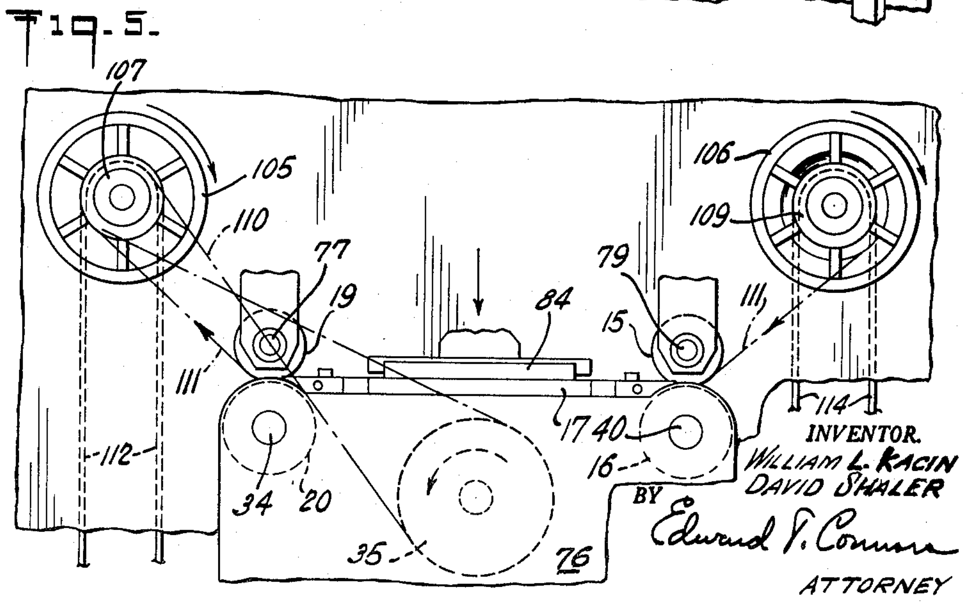
FIGURE 5 is a schematic illustration of the copy feed mechanism adapted to use roll film.

In FIGURE 5 there is shown a schematic illustration of the copy feed adapted to use roll film. In this embodiment, as stated above, the head 84 is replaced with another head having a grooved portion therein of a proper width to accommodate the roll of film being used. A pair of film reels 105 and 106 are respectively provided with pulleys 107 and 109. The take up reel pulley 107 is driven through a spring coil belt 110 by a pulley which may be the pulley 35 of FIGURE 3. In addition pulley grooves are provided on each of the pulleys 107 and 109 to receive spring belts 112 and 114 which may be either motor or hand operated.

The drive provided by the spring belt 110 is only sufficient to take up the slack and maintain the film in position on the take up reel 105, the actual pull of the film strip 111 between the bed 17 and the head 84 being accomplished by means of the opposed rollers 19 and 20. By this means the rate of drive will be precise as is required for the scanning operation.

In the event it is desired to skip one or more frames of the film 111 the control lever 95 may be lifted to its intermediate position and secured by the detent means 103 whereupon the head 84 is lifted out of tight contact with the film 111 but remains sufficiently close in position so that the film 111 may be quickly moved along its length by the belts 112 and 114 while being visually observed in the observation window 4.

While the invention is described and illustrated with reference to specific embodiments thereof it should be noted that other embodiments may be resorted to without departing from the invention. Therefore, the form of the invention set out above should be considered as illustrative and not as limiting the scope of the following claims.

We claim:

1. In a copy feed for a facsimile transmitter, the facsimile transmitter including scanning means, the copy feed comprising a card stack adapted to hold a plurality of cards with microfilm windows of lesser area than the card, card advance means for sequentially moving individual cards from the stack means past the scanning means, first pusher means positioned at the bottom of the card stack for moving the bottom card in the card stack to one side, feed wheel means positioned adjacent the bottom of the card stack so as to receive a card moved by the first pusher means, second pusher means positioned at one side of the path of cards moved by said feed wheel means and operative to move said cards at right angles to said path, means forming a scanning window, first opposed roller means positioned ahead of said scanning window so as to receive cards moved by the second pusher means, second opposed roller means positioned after said scanning window so as to remove cards therefrom, driving means for all of said rollers and both said pusher means, said driving means including fast and slow speed motor means, overriding clutch means connecting said fast motor with said driving means, cam operated switch means controlling said fast motor including a rotative shaft driven by said driving means, a cam member at the end of said rotative shaft, the cam member having a portion of its periphery of larger radius for actuating the switch means, adjustment means including slot defining means in the cam member, and screw means extending through the slot means releasably securing the cam means to the end of the rotative shaft, a head in juxtaposition to the scanning window adapted to hold the cards flat against the scanning window means, a pair of blocks, a pair of light springs supporting the head by the blocks, a pair of plates, and a pair of heavy springs carried by the plates, each spring carrying a block so that contact is first made against the card by the head urged by the light spring.

2. A copy feed for a facsimile transmitter, the facsimile transmitter including scanning means, the copy feed comprising a card stack adapted to hold a plurality of cards with microfilm windows of lesser area than the card, card advance means for sequentially moving individual cards from the stack means past the scanning means, first pusher means positioned at the bottom of the card stack for moving the bottom card in the card stack to one side, feed wheel means positioned adjacent the bottom of the card stack so as to receive a card moved by the first pusher means, second pusher means positioned at one side of the path of cards moved by said feed wheel means and operative to move said cards at right angles to said path, means forming a scanning window, first opposed roller means positioned ahead of said scanning window so as to receive cards moved by the second pusher means, second opposed roller means positioned after said scanning window so as to remove cards therefrom, driving means for all of said rollers and both said pusher means, said driving means including fast and slow speed motor means, overriding clutch means connecting said fast motor with said driving means, cam operated switch means controlling said fast motor including a rotative shaft driven by said driving means, a cam member at the end of said rotative shaft, the cam member having a portion of its periphery of larger radius for actuating the switch means, and adjustment means including slot defining means in the cam member, screw means extending through the slot means releasably securing the cam means to the end of the rotative shaft, a head in juxtaposition to the scanning window adapted to hold the cards flat against the scanning window means, a pair of blocks, a pair of light springs supporting the head by the blocks, a pair of plates, a pair of heavy springs carried by the plates, each spring carrying a block so that contact is first made against the card by the head urged by the light spring, a pair of rack members carrying each plate, a pair of pinions engaging the rack, and a lever to rotate the pinions whereby the head may be raised and lowered against a card.

References Cited by the Examiner

UNITED STATES PATENTS

| | | | |
|---|---|---|---|
| 2,571,785 | 10/51 | Thompson | 178—7.1 |
| 2,894,066 | 7/59 | Buckingham | 178—7.1 |
| 2,938,721 | 5/60 | Buckingham | 271—41 |
| 2,982,815 | 5/61 | Buckingham | 178—7.1 |

DAVID G. REDINBAUGH, *Primary Examiner.*

JOHN P. WILDMAN, *Examiner.*